(12) United States Patent
Chi et al.

(10) Patent No.: US 6,614,651 B2
(45) Date of Patent: Sep. 2, 2003

(54) SERVER BEZEL

(75) Inventors: William T. Chi, Mountain View, CA (US); James Britton, Half Moon Bay, CA (US); Thomas Yu, San Jose, CA (US); Gregory Jones, San Francisco, CA (US)

(73) Assignee: Sun Microsystems, Inc.

( * ) Notice: Subject to any disclaimer, the term of this patent is extended or adjusted under 35 U.S.C. 154(b) by 28 days.

(21) Appl. No.: 09/764,909

(22) Filed: Jan. 17, 2001

(65) Prior Publication Data
US 2002/0093785 A1 Jul. 18, 2002

(51) Int. Cl.[7] ................................................. G06F 1/16
(52) U.S. Cl. ..................... 361/683; 361/727; 312/223.1
(58) Field of Search ........................ 361/683, 724–727; 312/223.1, 223.2

(56) References Cited

U.S. PATENT DOCUMENTS

| | | | | |
|---|---|---|---|---|
| 5,557,499 A | * | 9/1996 | Reiter et al. | 361/685 |
| 5,924,782 A | * | 7/1999 | Park | 312/328 |
| 5,963,528 A | * | 10/1999 | Fujimura et al. | 369/77.1 |
| 6,227,630 B1 | * | 5/2001 | Brown et al. | 312/223.2 |
| 6,246,572 B1 | * | 6/2001 | Myers et al. | 361/683 |
| 6,259,605 B1 | * | 7/2001 | Schmitt | 361/727 |
| 6,320,835 B1 | * | 11/2001 | Kamei | 369/75.1 |
| 6,353,532 B1 | * | 3/2002 | Landrum et al. | 361/683 |

* cited by examiner

Primary Examiner—Darren Schuberg
Assistant Examiner—Hung Van Duong
(74) Attorney, Agent, or Firm—Blakely, Sokoloff, Taylor & Zafman

(57) ABSTRACT

A server housing assembly includes a main chassis and a bezel assembly. The main chassis preferably has a 1U form factor. The bezel assembly includes a bezel chassis slidably received by the main chassis such that the bezel assembly is slidable between an inward position and an outward position with respect to the main chassis. The bezel assembly includes a bezel pivotally coupled to the bezel chassis to be pivotable between an upper position and a lower position with respect to the main chassis. The main chassis includes main electronic components, and the bezel assembly includes bezel electronic components electrically coupled or coupleable to the main electronic components. The bezel assembly is operatively associated with the main chassis such that the bezel electronic components remain electrically coupled to the main electronic components through all positions of the bezel assembly or the bezel. The bezel assembly is slidable outwardly and pivotable to allow access to information storage devices such as hard disk drives of a server while the bezel remains active. An electrically and remotely controlled locking mechanism is provided to lock the bezel assembly in the inward position.

28 Claims, 6 Drawing Sheets

SERVER BEZEL

FIELD OF THE INVENTION

The present invention relates generally to housing or mounting assemblies for electronic systems or devices and, more particularly, to housing assemblies having movable bezels.

BACKGROUND

Modern network systems include many network components that are linked together to exchange data. One type of network component is commonly known as a server. A typical server includes at least one information storage device such as a hard disk drive. The information storage device of a server typically stores information such as the pages for an Internet web site.

An Internet Service Provider (ISP) will typically maintain several server units in a particular location. The server units are typically mounted on server racks that hold many servers stacked vertically. One type of server rack that is commonly used to accommodate server units that are approximately 19 inches wide is referred to as a "19-inch" rack. An ISP typically maintains servers for many different customers. These customers either own one or more server units or lease storage space or bandwidth from the ISP.

Servers can be manufactured according to standardized dimensions. A server manufactured to the standard form factor known as 1U will have a height of 1.75 inches. Likewise, a 2U server will have a height of 3.5 inches. Because physical space to store the servers is a cost to the ISP, the trend is to manufacture servers that are increasingly smaller in size (or the same size) yet have the same or more information storage capacity and bandwidth.

A typical server includes a main chassis that holds a motherboard and at least one information storage device. In some servers, the information storage device will be accessible or removable through the front face or panel of the server housing. Thus, a particular information storage device can be removed and replaced in the event of a failure or an upgrade.

Typically, servers having removable information storage devices include some type of latching or locking mechanism to secure the information storage device within the housing of the server. Typical locking mechanisms include key locks, mechanical detents, push, pull, and other style latches.

Some servers include a cover plate that is attached to the front face of the server body to cover the electronics and the information storage device in the server. As a security feature, some types of servers include cover plates that have locks. Such locks can prevent improper or inadvertent access to a server. Security is a great concern in ISP data centers where multiple customers share the same physical rack or location for their servers. To deter tampering and sabotage, electronics designers have implemented various types of locks to provide security for such products.

One type of cover plate that can be used on a server is a removable cover plate that is held to the server body with friction snaps. The removable cover plates, however, are not "active," i.e., do not include information input or output mechanisms such as indicators or ports because it is difficult or cumbersome to have a connection between the input or output mechanisms of the cover plate and the server electronics.

Another type of cover plate is similar to a door attached to the server body by a hinge or a complicated multi-link mechanism. Some of these types of mechanisms allow the door to swing out and down at the same time. A hinged or multi-link cover plate may not be able to be fully opened in the event that the server is mounted above or below another server, another component, or a shelf that may interfere with the opening of the cover plate. Some server housing designs are simply increased in height to accommodate a hinge or link mechanism or to provide clearance for opening the cover plate. Also, a typical server rack is over 6 feet tall. The servers mounted at the upper portion of the rack are typically above eye level for the average person. A server with a cover plate that is hinged along its bottom horizontal edge, for example, and is pivoted down when opened can be very inconvenient for an average person to access the information storage units when such a server is mounted above eye level.

SUMMARY OF THE INVENTION

In one embodiment of the invention, a server housing assembly includes a main chassis and a bezel assembly. The bezel assembly includes a bezel chassis slidably received by the main chassis such that the bezel assembly is slidable between an inward position and an outward position with respect to the main chassis. The bezel assembly further includes a bezel pivotally coupled to the bezel chassis to be pivotable between an upper position and a lower position with respect to the main chassis.

In one embodiment, the main chassis includes main electronic components, and the bezel assembly includes bezel electronic components electrically coupleable or coupled to the main electronic components. The bezel assembly is operatively associated with the main chassis such that the bezel electronic components, when electrically coupled to the main electronic components, remain coupled when the bezel assembly is in the inward position or the outward position or any position therebetween, and the bezel is in the upper position or the lower position or any position therebetween.

BRIEF DESCRIPTION OF THE DRAWINGS

The invention is illustrated by way of example, and not limitation, in the figures of the accompanying drawings in which.

DETAILED DESCRIPTION OF THE INVENTION

Figure 1:
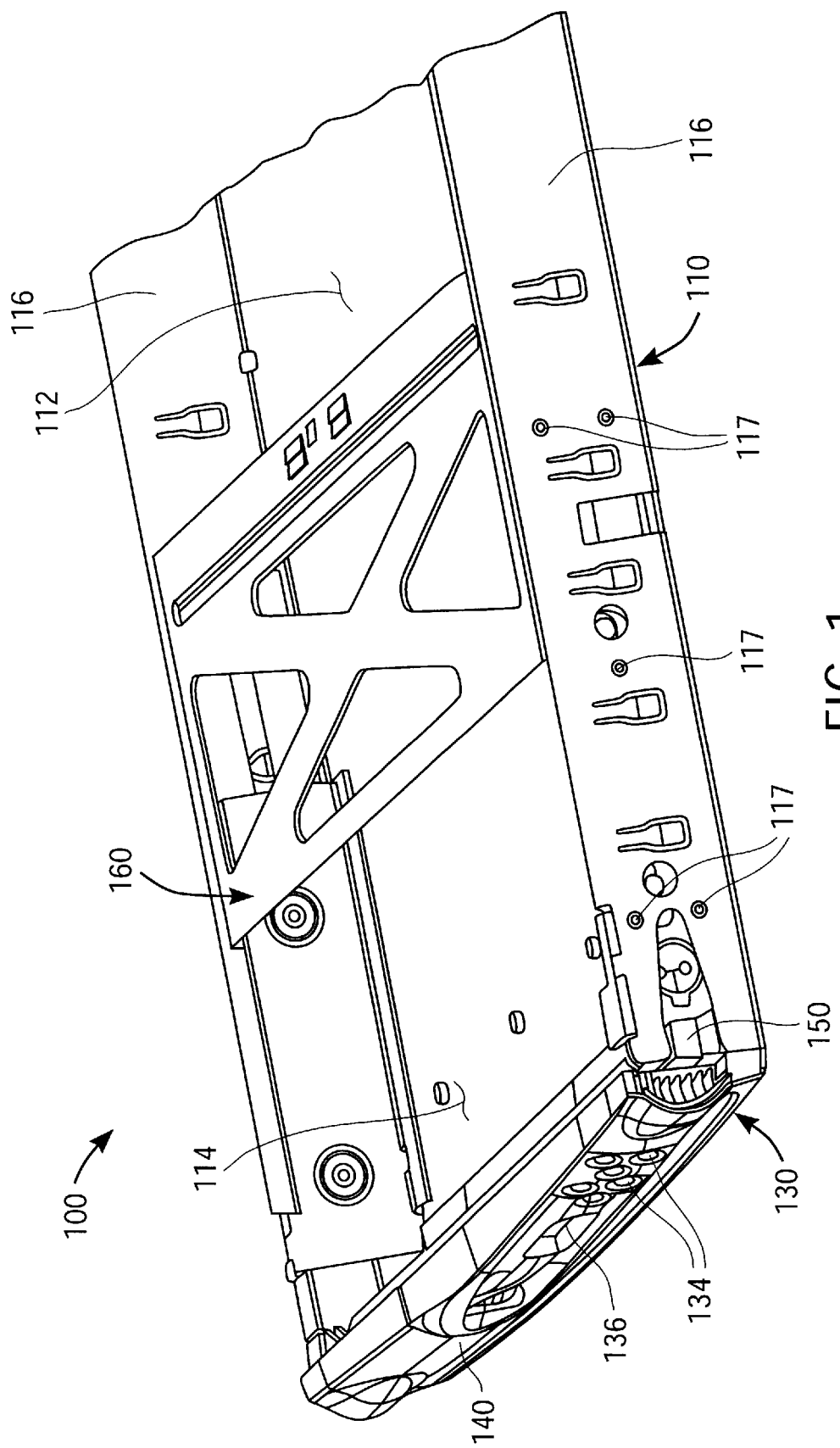
FIG. 1 is a perspective view of one embodiment of a housing assembly.

In the following description, numerous details are set forth, such as orientations of components, types of material, etc. It will be apparent, however, to one skilled in the art, that the present invention may be practiced without these specific details. In other instances, well-known structures and devices are shown in simplified or schematic form, rather than in detail, in order to avoid obscuring the present invention.

In one embodiment, a housing assembly includes a main chassis and a bezel assembly. The bezel assembly includes a bezel chassis slidably received by the main chassis such that the bezel assembly is slidable between an inward position and an outward position with respect to the main chassis. In one embodiment, the bezel assembly includes a bezel pivotally coupled to the bezel chassis to be pivotable between an upper position and a lower position with respect to the main chassis.

In one embodiment, the main chassis includes main electronic components, and the bezel assembly includes bezel electronic components electrically coupled or coupleable to the main electronic components. The bezel assembly is operatively associated with the main chassis such that the bezel electronic components remain electrically coupled to the main electronic components through movement of the bezel assembly or the bezel between all positions with respect to the main chassis.

Various embodiments of the present invention can provide a low profile 1U form factor server housing that can accommodate four removable hard disk drives. In one embodiment, the server housing includes a cosmetic front bezel that is moveable in two degrees of freedom. An embodiment of the bezel is slidable outwardly with respect to a main server chassis, and is pivotable at an outward position to allow full access to the entire front space of the unit. Pivoting is preferably allowed through a full 180 degrees with respect to the main server chassis; but such is not necessary. It may only be necessary to be pivotable the number of degrees that enables an individual to access the interior of the server housing to perform a desired function.

An embodiment of the bezel provides an active bezel that includes electronic components that may include information input and output mechanisms. The input mechanism can include various types of manually actuated devices including, but not limited to, buttons, keypads, or dials, for example. Exemplary output mechanisms can include alphanumeric displays or one or more indicator lights or LEDs. Other types of input or output mechanisms can provide coupling mechanisms such as a connectors or ports (either wired or wireless) to which an external device can be coupled to transfer data. Preferably, the bezel electronic components remain coupled to the main electronic components of the main chassis so that the input and output mechanisms remain active when the bezel assembly is in any of its various positions with respect to the main chassis.

An electrically actuated locking mechanism can be provided in one embodiment of a housing assembly. Preferably, the locking mechanism is operatively associated with the bezel chassis and the main chassis to lock the bezel assembly in the inward position. In a server, the locking mechanism can hinder unauthorized access to the information storage devices in the housing assembly. In one embodiment, the locking mechanism is remotely controllable through an input mechanism of the bezel assembly or through the network to which the server is connected.

FIG. 1 shows an embodiment of a housing assembly 100. Housing assembly 100 includes a main chassis 110 and a bezel assembly 130. In a preferred embodiment, the main chassis 110 is a server chassis having a 1U form factor. The main chassis 110 includes a space 112 for main electronic components (not shown). The main electronic components mounted in the main chassis 110 can include one or more circuit boards including various electronic or electromechanical components such as processors, memory chips, heat sinks, connectors, and the like. A motherboard such as the type found in a server or a computer is an example of a collection of main electronic components.

The main chassis 110 also includes at least one space 114 for one or more information storage devices. Exemplary information storage devices include, but are not limited to, hard disk drives, CD drives, tape drives, and the like. Preferably, the main chassis 110 can accommodate four hard disk drives in a side-by-side orientation across the width of the main chassis 110.

Various embodiments of the housing assembly 100 may include information storage devices that are removable and can be easily accessed. Embodiments of the housing assembly 100 may also provide a locking feature to prevent or hinder unauthorized access to the information storage devices.

The main chassis 110 shown in FIG. 1 includes sidewalls 116 that have mounting features 117 so that the housing assembly 100 can be rack mounted. In one embodiment, the housing assembly 100 (together with the various electrical components mounted therein) is a server and is mounted in a vertically oriented server rack together with many other servers or other electronic networking devices.

Bezel assembly 130 is positioned on the front face of the housing assembly 100. In one embodiment, bezel assembly 130 is an active bezel assembly that includes bezel electronic components. The bezel electronic components may include an information input mechanism, an information output mechanism, or both. As shown in FIG. 1, an exemplary information input mechanism includes one or more buttons 134. An example of an information output mechanism is display 136.

In the embodiment shown in FIG. 1, bezel assembly 130 further includes bezel 140, bezel frame 150, and bezel chassis 160. Bezel 140 is mounted to the bezel frame 150. The bezel 140, via bezel frame 150, is preferably pivotally coupled to bezel chassis 160. Bezel chassis 160 is slidably received by the main chassis 110 such that the bezel assembly 130 is slidable between an inward position (shown in FIG. 1) and an outward position (shown in FIG. 2, discussed below) with respect to the main chassis 110. When the bezel assembly 130 is in the inward position, the pivoting mechanism (described below) is hidden from view.

Figure 2:
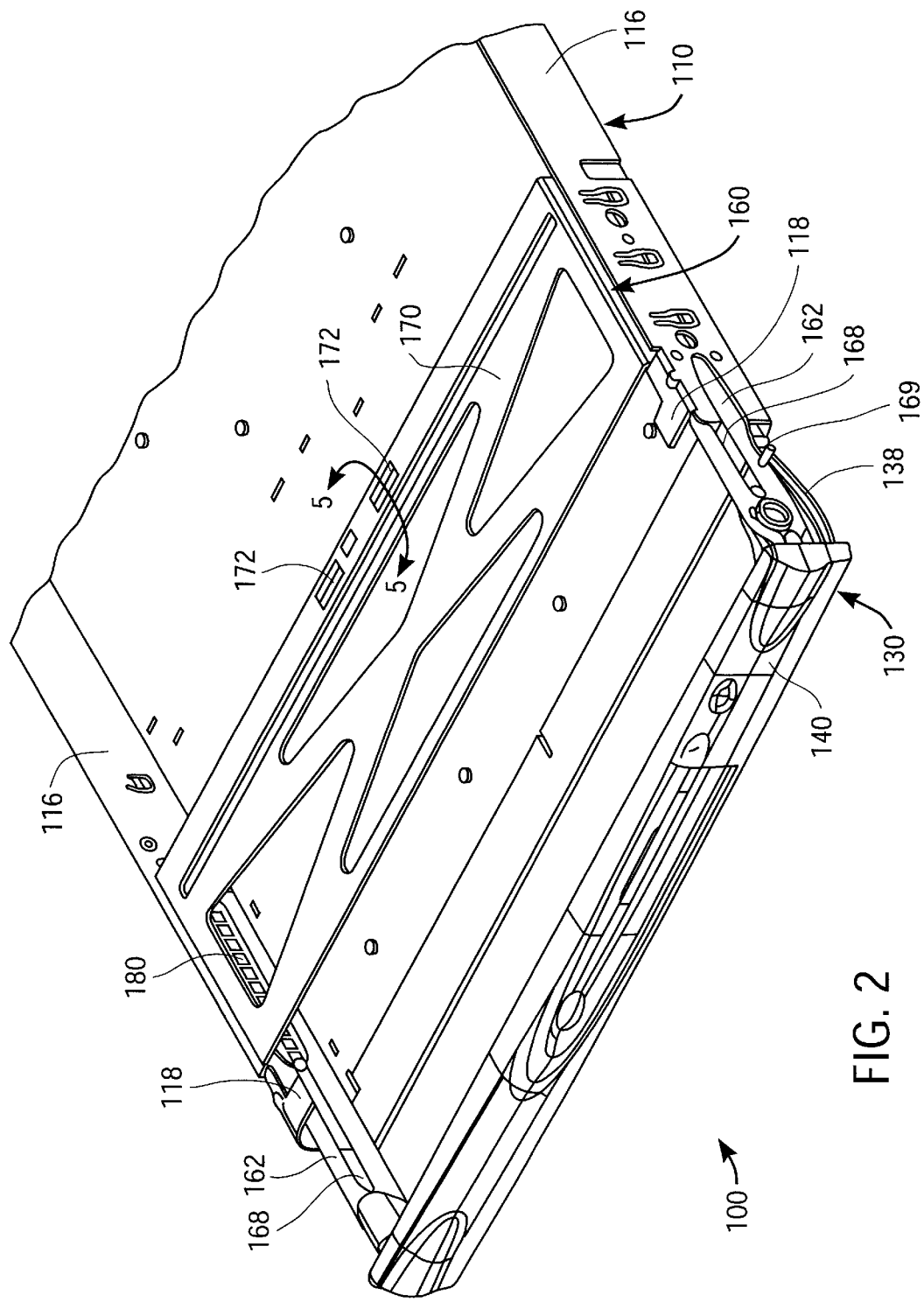
FIG. 2 is a perspective view of one embodiment of a housing assembly with a bezel chassis in an outward position with respect to a main chassis.

FIG. 2 shows the housing assembly 100 with the bezel chassis 160 in its outward position with respect to the main chassis 110. FIG. 2 shows an embodiment of the housing assembly 100 in which the bezel assembly 130 is operatively associated with the main chassis 110 such that the bezel electronic components (not shown) remain electronically coupleable to the main electronic components through all positions of the bezel 140. A cable 138 provides the coupling connection between the bezel electronic components and the main electronic components. Cable 138, in one embodiment, is a multiple-wire, round, insulated cable. Alternatively, any suitable type of wire, cable, or electrical conductor can provide the coupling connection. It should be noted that the bezel electronic components need to not be coupled to the main electronic components at all times. For instance, the cable 138 can include at connector that can be removably plugged into a corresponding connector associated with the main electronic components. Thus, in one embodiment, the bezel can be separated from the remaining components of the bezel assembly for repair or replacement.

The bezel chassis 160 includes a top cross member 170 extending orthogonally between two generally parallel opposed side arms 162. The side arms 162 extend forwardly from the top cross member 170. In an embodiment that includes a cable 138, such as shown in FIG. 2, at least one side arm 162 preferably includes a cable guide 169 to hold cable 138 in position during sliding motion of the bezel chassis 160.

Side arms 162 define slots 168 that cooperate with slide bearings 180 such that the bezel chassis 160 is slidable between an inward position and an outward position with respect to the main chassis 110. In this embodiment, slide bearings 180 are mounted to divider walls (not shown) of the main chassis 110 as describe below with reference to FIG. 3. A slide stop 118 can be provided on either side wall 116, or on both side walls, to provide a physical limit to the outward position of the bezel assembly.

Top cross member 170 may include one or more retaining tabs 172. Retaining tabs 172 can be provided to cooperate with a locking mechanism (not shown) to lock the bezel assembly 130 in its inward position with respect to the main chassis 110. Retaining tabs 172 and their interaction with a locking mechanism are described in more detail below.

Figure 3:
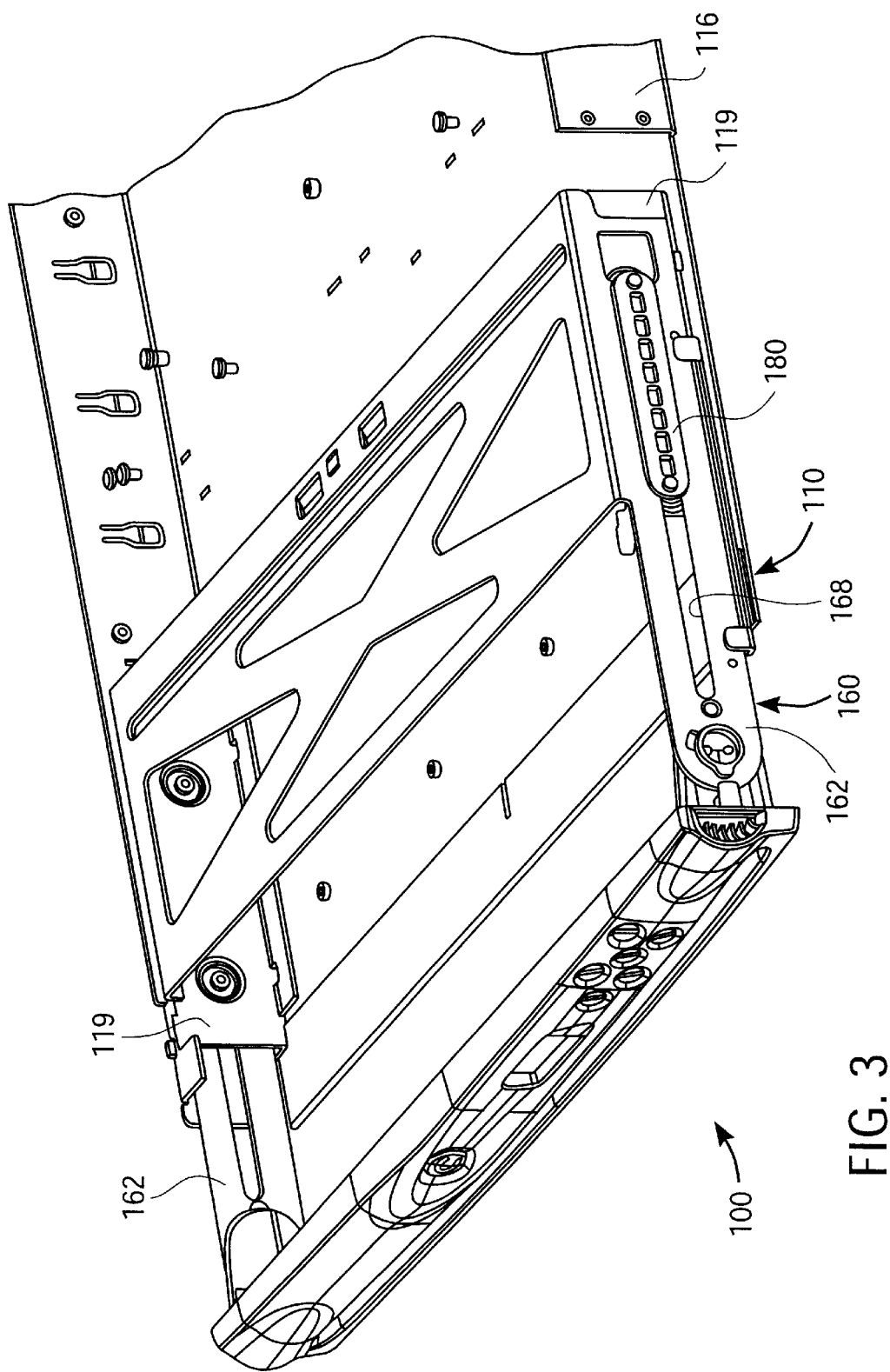
FIG. 3 is a partial cutaway view of the housing assembly of FIG. 2.

FIG. 3 shows housing assembly 100 with a portion of the main chassis 110 (in particular, side wall 116) is cut away to reveal the bezel chassis 160 assembled with the slide bearing 180. Side arm 162 defines a slot 168 into which the slide bearing 180 is assembled. Slide bearing 180 is mounted to a divider wall 119, which is mounted to the floor of the main chassis 110. A divider wall 119 is mounted on opposing sides of the main chassis to accommodate both side arms 162 of the bezel chassis 160.

Figure 4:
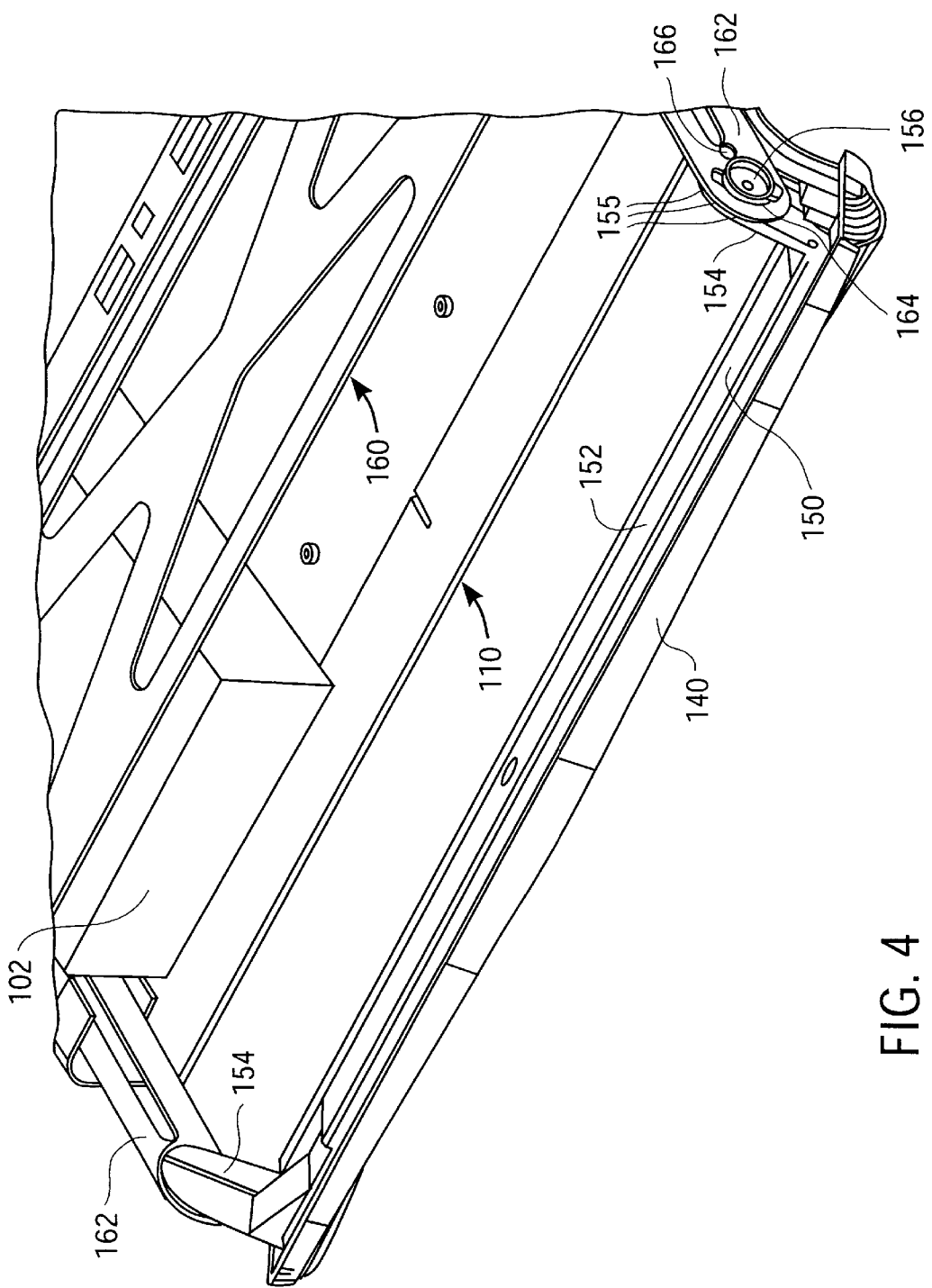
FIG. 4 is a perspective view of one embodiment of a bezel pivoted downwardly with respect to a main chassis.

FIG. 4 shows how the bezel 140 can be pivoted between an upper position and a lower position with respect to the main chassis 110. In the embodiment shown in FIG. 4, the bezel 140 is pivotable after the bezel chassis 160 has been moved outwardly with respect to the main chassis 110. In FIG. 4, the bezel 140 has only been pivoted downward about 45 degrees with respect to the front side or plane defined by the front vertical opening of the main chassis 140. Preferably, the bezel 140 can pivot a full 90 degrees upward (to an upper position) or 90 degrees downward (to a lower position) to be pivotable about 180 degrees with respect to the front side of the main chassis. When the bezel is pivoted either upwardly or downwardly, an information storage device 102 can be removed or inserted through the opening at the front of the main chassis.

FIG. 4 shows the bezel 140 coupled to a bezel frame 150. Bezel frame 150 includes a front wall 152 and two opposed end flanges 154 at each end of front wall 152. Bezel 140 and bezel frame 150 are preferably assembled to provide a housing to carry the bezel electronic components (not shown).

As shown in FIG. 4, the bezel 140 is pivotally coupled to the side arms 162 of the bezel chassis 160 via the bezel frame 150. The end flanges 154 of the bezel frame 150 are preferably positioned inwardly with respect to the side arms 162. End flanges 154 include cylindrical protrusions 156 that extend axially into corresponding openings 164 in respective side arms 162.

The side arms 162 are preferably rigid enough to hold the bezel and bezel frame, yet flexible to the extent that the side arms 162 can be slightly spread apart to clear the cylindrical protrusions, thus allowing removal of the bezel frame 150. Thus, the bezel 140 (including the bezel frame 150) can be easily interchanged, without the use of tools or fasteners.

In one embodiment, each side arm 162 may include a protrusion 166 extending from the inside surface of each side arm 162 that cooperates with a set of dimples 155 defined on the corresponding outwardly facing surface of each respective end flange 154. The protrusions 166 and dimples 155 provide a detent mechanism that holds the bezel 140 and bezel frame 150 in any of a number of selected positions throughout its pivoting range.

The various embodiments of the housing assembly described above include many parts and components that can be made from materials that are known in the electronic and computer arts. For example, parts such as the main chassis and the bezel chassis are typically made of sheet metal, but could also be made of any suitable plastic. The bezel and bezel frame are preferably made of injection molded plastic, but can also be made of metal, or an alloy. Exemplary types of molded plastic include ABS, Acrylic, Polycarbonate, etc.

The embodiments of a housing assembly described above can further include a locking mechanism to lock the bezel chassis in place with respect to the main chassis. One embodiment of an electrically actuated locking mechanism 190 is shown in FIG. 5.

Figure 5:
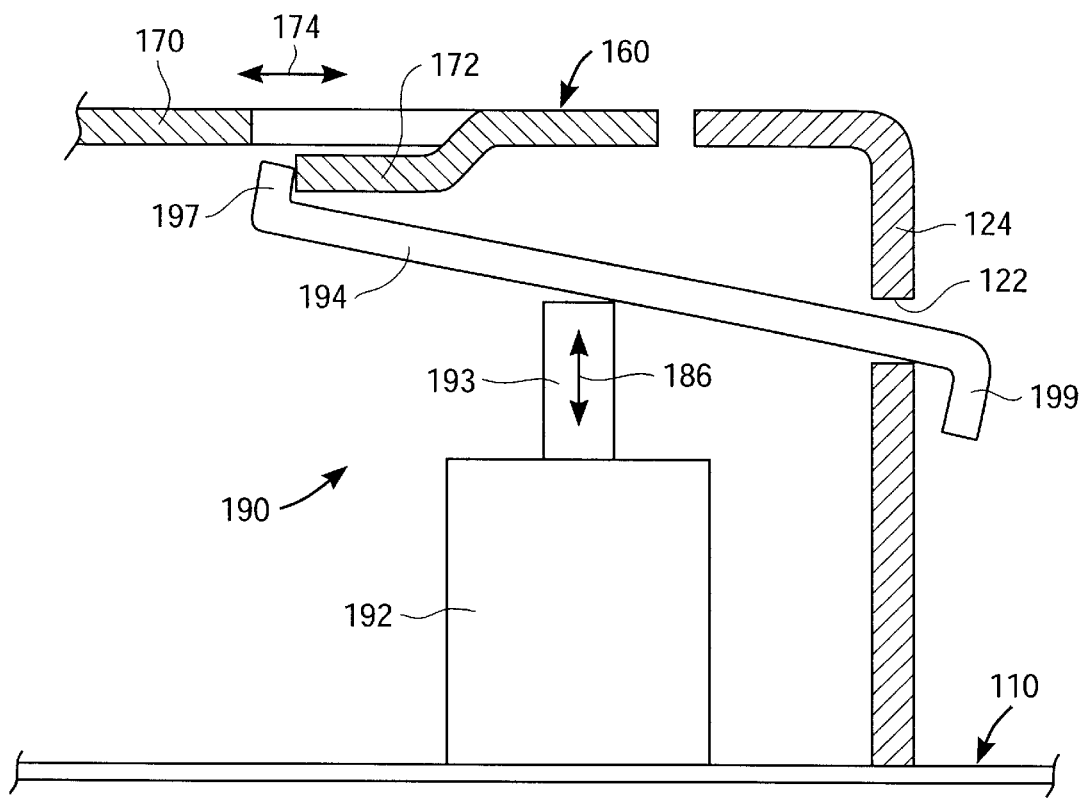
FIG. 5 is a side cross sectional view, taken along line 5—5 of FIG. 2, of one embodiment of a locking mechanism.

FIG. 5 shows locking mechanism 190 including a solenoid 192 and a locking arm 194. The locking mechanism 192 is operatively associated with the bezel chassis 160 and the main chassis 110 to lock the bezel assembly in the inward position. The solenoid 192 is preferably a bi-stable solenoid that is energized to move its core 193 between two stable positions. The current applied to the solenoid 192 can be reversed to move the core in the direction of the arrows 186. In one embodiment, the locking mechanism 190 is remotely controllable through a network.

In FIG. 5, the locking mechanism is shown in the locked position in which the core 193 of the solenoid 192 is pushed upwardly against the locking arm 194 such that the first hooked end 197 of the locking arm 194 releasably interacts with a retaining tab 172 extending downwardly from the top cross member 170. The second hooked end 199 of the locking arm 194 is operatively associated with the main chassis 110 by extending through an opening 122 in a wall 124. In this embodiment, the locking arm 194 is pivotally coupled to the main chassis 110. With the locking arm 194 in this position, the bezel chassis 160 is locked in the inward position with respect to the main chassis 110. To unlock, the current to the solenoid is reversed, thus moving the core 193 down such that the first hooked end 197 clears the retaining tab 172 so that the bezel chassis 160 can be moved to its outward position.

The locking mechanism can be controlled remotely by software through a network such as in the example of a web browser-based administration system for network servers. The solenoid can be coupled to general-purpose input/output circuitry on the motherboard. In another embodiment, a user can input a lock/unlock code through the input means on the bezel.

Figure 6:
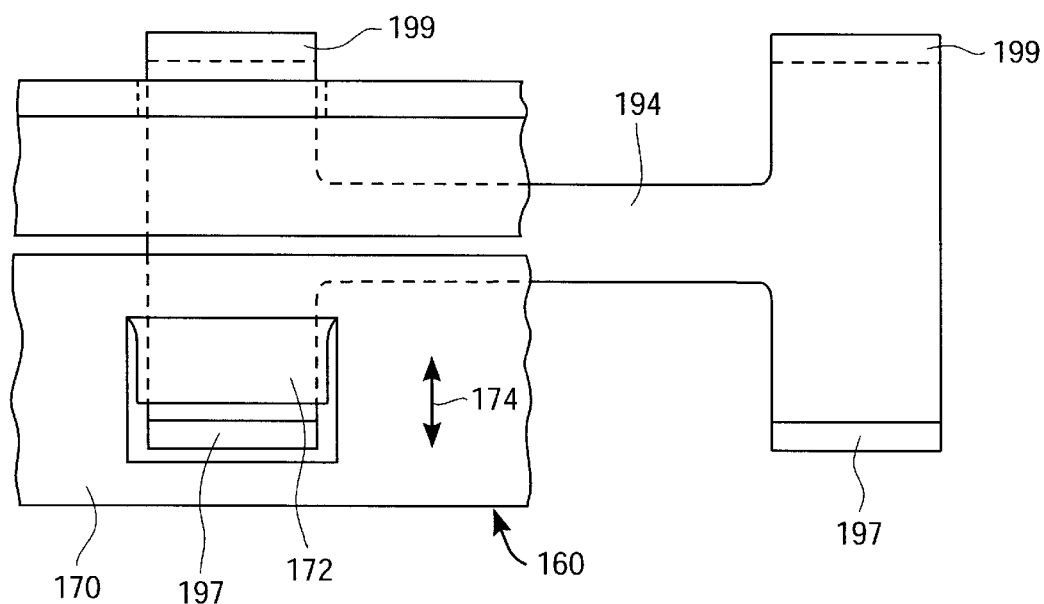
FIG. 6 is a top partial cutaway view of a locking arm in one embodiment of a locking mechanism.

FIG. 6 shows a top view of one embodiment of a locking arm 194. The bezel chassis 160 is shown in cutaway portion. Arrows 174 indicate the direction of movement of bezel chassis 160. Retaining tab 172 is shown as a part of the top cross member 170. Locking arm 194 has an H-shape when viewed from the top. The H-shaped body of locking arm 194 provides two first ends 197 and two second hooked ends 199. In this embodiment, locking arm 194 can interact with two retaining tabs 172 (see FIG. 2).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A housing assembly comprising:
    a main chassis having a 1U form factor to accommodate a plurality of information storage devices in a side-by-side orientation across the width of the main chassis; and
    a bezel assembly to carry bezel electronic components electrically coupleable to the main electronic components, the bezel assembly including a bezel pivotable between an upper position and a lower position with respect to the main chassis, the bezel assembly operatively associated with the main chassis such that the bezel electronic components remain electrically coupleable to the main electronic components when the bezel is in the upper or lower position or any position therebetween.

2. A housing assembly comprising:
    a main chassis to hold main electronic components; and
    a bezel assembly to carry bezel electronic components electrically coupleable to the main electronic components, the bezel assembly including a bezel pivotable between an upper position and a lower position with respect to the main chassis and information input means, the bezel assembly operatively associated with the main chassis such that the bezel electronic components remain electrically coupleable to the main electronic components when the bezel is in the upper or lower position or any position therebetween.

3. The housing assembly of claim 2 wherein the information input means is a keypad.

4. The housing assembly of claim 3 wherein the information input means is a connector.

5. A housing assembly comprising:
    a main chassis to hold main electronic components; and
    a bezel assembly to carry bezel electronic components electrically coupleable to the main electronic components, the bezel assembly including a bezel pivotable between an upper position and a lower position with respect to the main chassis and a connector to output information, the bezel assembly operatively associated with the main chassis such that the bezel electronic components remain electrically coupleable to the main electronic components when the bezel is in the upper or lower position or any position therebetween.

6. A housing assembly comprising:
    a main chassis to hold main electronic components; and
    a bezel assembly to carry bezel electronic components electrically coupleable to the main electronic components, the bezel assembly including a bezel pivotable between an upper position and a lower position with respect to the main chassis and a bezel chassis slidably received by the main chassis such that the bezel assembly is slidable between an inward position and an outward position with respect to the main chassis, the bezel assembly operatively associated with the main chassis such that the bezel electronic components remain electrically coupleable to the main electronic components when the bezel is in the upper or lower position or any position therebetween; and
    an electrically actuated locking mechanism operatively associated with the bezel chassis and the main chassis to lock the bezel assembly in the inward position.

7. The housing assembly of claim 6 wherein the bezel chassis includes a retaining tab, the locking mechanism includes a solenoid and a locking arm, and the locking arm is operatively associated with the solenoid, the retaining tab, and the main chassis to lock the bezel assembly in the inward position.

8. The housing assembly of claim 6 wherein the locking mechanism is remotely controllable.

9. A housing assembly comprising:
    a main chassis having a 1U form factor to accommodate a plurality of information storage devices in a side-by-side orientation across the width of the main chassis; and
    a bezel assembly to carry bezel electronic components electrically compleable to the main electronic components, the bezel assembly including a bezel chassis slidably received by the main chassis such that the bezel assembly is slidable between an inward position and an outward position with respect to the main chassis, the bezel assembly operatively associated with the main chassis such that the bezel electronic components remain electrically compleable to the main electronic components when the bezel assembly is in the inward position or the outward position or any position therebetween.

10. A housing assembly comprising:
    a main chassis to hold main electronic components; and
    a bezel assembly to carry bezel electronic components electrically compleable to the main electronic components, the bezel assembly including a bezel chassis slidably received by the main chassis such that the bezel assembly is slidable between an inward position and an outward position with respect to the main chassis and information input means, the bezel assembly operatively associated with the main chassis such that the bezel electronic components remain electrically compleable to the main electronic components when the bezel assembly is in the inward position or the outward position or any position therebetween.

11. The housing assembly of claim 10 wherein the information input means is a keypad.

12. The housing assembly of claim 11 wherein the information input means is a connector.

13. A housing assembly comprising:
    a main chassis to hold main electronic components; and
    a bezel assembly to carry bezel electronic components electrically compleable to the main electronic components, the bezel assembly including a bezel chassis slidably received by the main chassis such that the bezel assembly is slidable between an inward position and an outward position with respect to the main chassis and a connector to output information, the bezel assembly operatively associated with the main chassis such that the bezel electronic components remain electrically compleable to the main electronic components when the bezel assembly is in the inward position or the outward position or any position therebetween.

14. A housing assembly comprising:
    a main chassis to hold main electronic components; and
    a bezel assembly to carry bezel electronic components electrically compleable to the main electronic components, the bezel assembly including a bezel chassis slidably received by the main chassis such that the bezel assembly is slidable between an inward position and an outward position with respect to the main chassis, the bezel assembly operatively associated with the main chassis such that the bezel electronic components remain electrically compleable to the main electronic components when the bezel assembly is in the inward position or the outward position or any position therebetween; and an electrically actuated locking mechanism operatively associated with the bezel chassis and the main chassis to lock the bezel assembly in the inward position.

15. The housing assembly of claim 14 wherein the bezel chassis includes a retaining tab, the locking mechanism includes a solenoid and a locking arm, and the locking arm is operatively associated with the solenoid, the retaining tab, and the main chassis to lock the bezel assembly in the inward position.

16. The housing assembly of claim 14 wherein the locking mechanism is remotely controllable.

17. A server housing assembly comprising:

a main chassis having a 1U form factor to accommodate a plurality of information storage devices in a side-by-side orientation across the width of the main chassis; and a bezel assembly including a bezel chassis slidably received by the main chassis such that the bezel assembly is slidable between an inward position and an outward position with respect to the main chassis, the bezel assembly further including information input means and a bezel pivotally coupled to the bezel chassis to be pivotable between an upper position and a lower position with respect to the main chassis.

18. A server housing assembly comprising:

a main chassis; and a bezel assembly including a bezel chassis slidably received by the main chassis such that the bezel assembly is slidable between an inward position and an outward position with respect to the main chassis, the bezel assembly further including information input means and a bezel pivotally coupled to the bezel chassis to be pivotable between an upper position and a lower position with respect to the main chassis.

19. The server housing assembly of claim 18 wherein the information input means is a keypad.

20. The server housing assembly of claim 19 wherein the information input means is a connector.

21. A server housing assembly comprising:

a main chassis; and a bezel assembly including a bezel chassis slidably received by the main chassis such that the bezel assembly is slidable between an inward position and an outward position with respect to the main chassis, the bezel assembly further including a connector to output information and a bezel pivotally coupled to the bezel chassis to be pivotable between an upper position and a lower position with respect to the main chassis.

22. A server housing assembly comprising:

a main chassis;

a bezel assembly including a bezel chassis slidably received by the main chassis such that the bezel assembly is slidable between an inward position and an outward position with respect to the main chassis, the bezel assembly further including information input means and a bezel pivotally coupled to the bezel chassis to be pivotable between an upper position and a lower position with respect to the main chassis; and an electrically actuated locking mechanism operatively associated with the bezel chassis and the main chassis to lock the bezel assembly in the inward position.

23. The housing assembly of claim 22 wherein the bezel chassis includes a retaining tab, the locking mechanism includes a solenoid and a locking arm, and the locking arm is operatively associated with the solenoid, the retaining tab, and the main chassis to lock the bezel assembly in the inward position.

24. The housing assembly of claim 22 wherein the locking mechanism is remotely controllable.

25. A server housing assembly having an electrically actuated locking mechanism, the locking mechanism comprising:

a solenoid; and a locking arm, the locking arm operatively associated with the solenoid to lock a bezel chassis with respect to a main chassis of the server housing assembly, the bezel chassis having a retaining tab that interacts with the locking arm to lock the bezel chassis.

26. The assembly of claim 25 wherein the locking mechanism is remotely controllable.

27. The assembly of claim 25 wherein the locking arm comprises an elongated member having two ends, one of the two ends being pivotally coupled to the main chassis and the other of the two ends releasably interacting with the retaining tab to lock the bezel chassis.

28. The assembly of claim 26 wherein the locking mechanism is remotely controllable through a network.

* * * * *